Jan. 2, 1945.  W. H. SILVER  2,366,155
POWER LIFT MECHANISM
Filed Aug. 10, 1942  3 Sheets-Sheet 1

INVENTOR
WALTER H. SILVER
BY 
ATTORNEYS

Jan. 2, 1945.　　　　W. H. SILVER　　　　2,366,155
POWER LIFT MECHANISM
Filed Aug. 10, 1942　　　　3 Sheets-Sheet 2
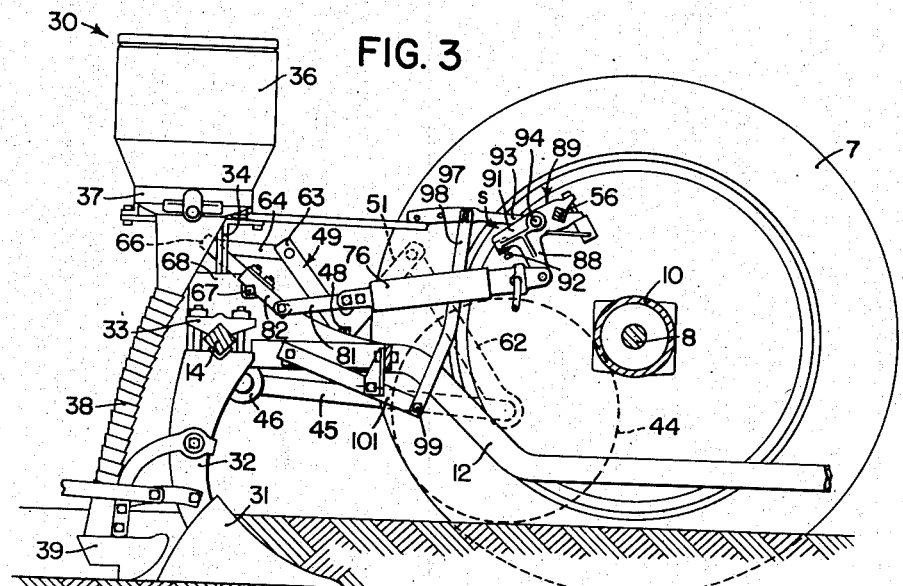
FIG. 3
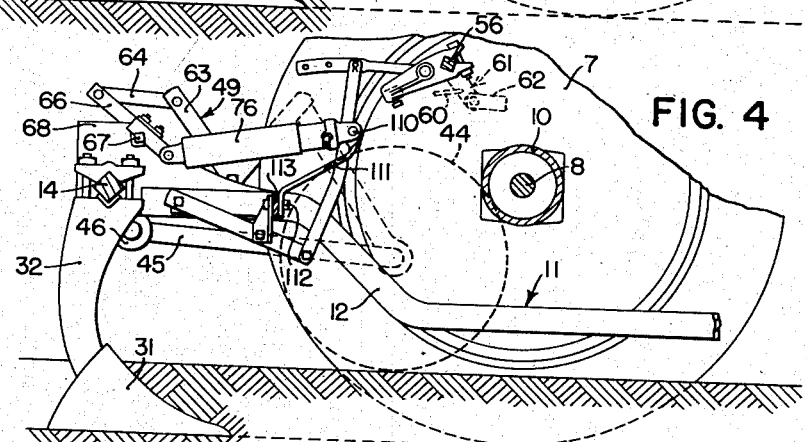
FIG. 4
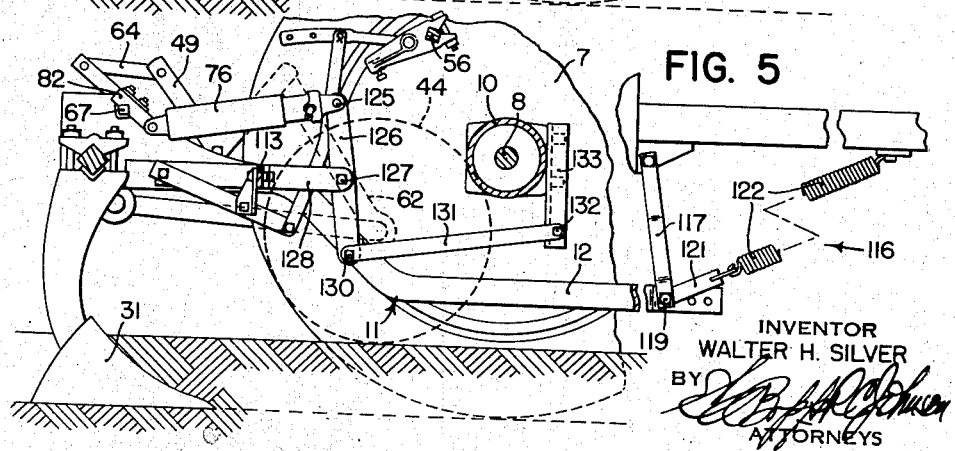
FIG. 5
INVENTOR
WALTER H. SILVER
BY 
ATTORNEYS Jan. 2, 1945. W. H. SILVER 2,366,155
POWER LIFT MECHANISM
Filed Aug. 10, 1942 3 Sheets-Sheet 3

INVENTOR.
WALTER H. SILVER
BY
ATTORNEYS

Patented Jan. 2, 1945

2,366,155

UNITED STATES PATENT OFFICE 2,366,155

POWER LIFT MECHANISM

Walter H. Silver, Moline, Ill., assignor to Deere & Company, Moline, Ill., a corporation of Illinois Application August 10, 1942, Serial No. 454,343

24 Claims. (Cl. 97—50)

The present invention relates generally to agricultural implements and more particularly to power operated means for controlling the implement and for raising the same into an inoperative or transport position.

The object and general nature of the present invention is the provision of power operated means in the form of two separately and optionally controllable units arranged to perform certain depth adjustments, in connection with other power operated means for shifting the implement into a raised or transport position. More specifically, it is a feature of this invention to provide a tractor propelled implement having a pair of laterally spaced gauge wheels, each of which is shifted by means of a lift cylinder unit, with means deriving power from the tractor for optionally actuating the lift cylinders. A further feature of this invention is the provision of additional means also deriving power from the tractor for raising both the implement and its gauge wheels into a raised or transport position.

Another important feature of this invention is the provision of an agricultural implement yieldingly connected, as by spring hitch means or the like, with the tractor, and with a pair of hydraulic units connected to shift the gauge wheels optionally and independently, the connections being such that the gauge wheels are automatically moved into a more shallow operating position when the yielding hitch means yields, as under an overload. More specifically, it is a feature of this invention to provide a tool or implement for association with a tractor of the type having a power lift movable through a given range, with depth controlling means individually adjustable and connected with the tractor power lift, whereby depth adjustment may be secured with the power lift in its lowered or normal operating position, the individual adjusting means reacting against the power lift and the latter acting through separable means for lifting the tool into inoperative position. Additionally, it is a feature of this invention to provide hydraulic units in the connections between the power lift and the implement, whereby individual adjustment may be secured as desired.

These and other objects and advantages of the present invention will be apparent to those skilled in the art after a consideration of the following detailed description, taken in conjunction with the accompanying drawings, in which Figure 1 is a plan view of an implement incorporating the principles of the present invention;

Figure 3 is a section taken generally along the line 3—3 of Figure 1; and

Figures 4 and 5 are views similar to Figure 3, showing modified forms of my invention.

Figure 1:
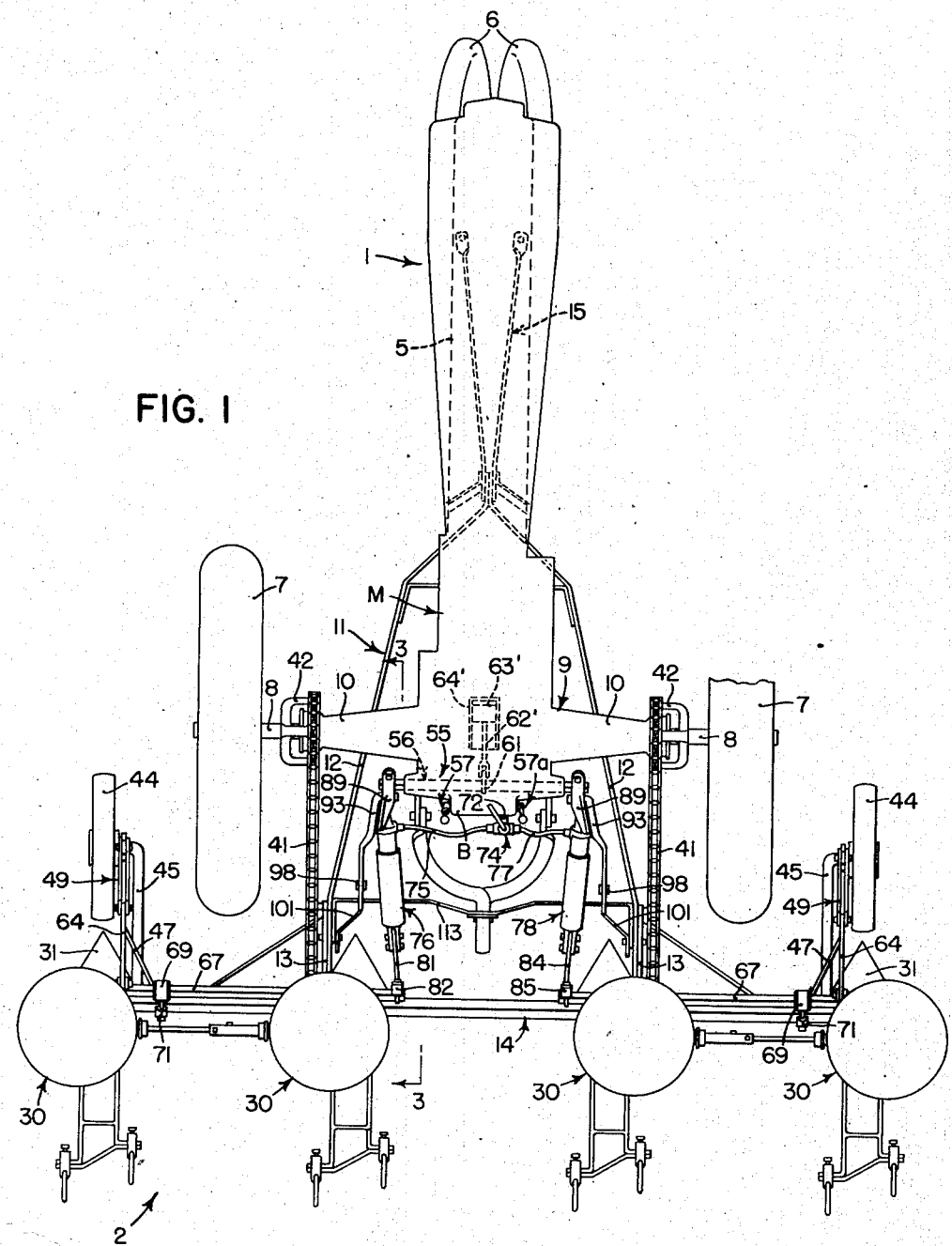
Figure 1:

Referring now to the drawings, more particularly to Figure 1, the reference numeral 1 indicates the tractor and the reference numeral 2 indicates the implement. The tractor 1 is of more or less conventional construction so far as the present invention is concerned, comprising a means serving as a supporting or propelling frame, indicated at 5, supported on front steering wheels 6 and rear traction wheels 7. The latter are mounted on axle shafts 8 which are journaled within a rear axle housing 9, the latter including lateral extensions 10 receiving the axle shafts 8.

The implement 2 comprises a frame 11 and is similar to the implement shown in my prior Patent Re. 21,266, dated November 14, 1939, to which reference may be made if necessary. The tool frame or tool support 11 includes a pair of generally longitudinally extending beams or frame members 12 which are welded or otherwise secured to plates 13 that are fixed in laterally spaced relation to a rear transverse tool bar 14, the latter preferably extending laterally outwardly beyond and rearwardly of the rear tractor wheels 7. The frame members 12 converge forwardly and at the forward ends are connected by hitch means 15 to the front portion of the tractor.

Figures 1 and 3 show the implement arranged as a four row planter, there being four planting units 30 fixed to or connected with the tool bar 14. Each of the units 30 includes a furrow opener or sweep 31 fixed to the lower end of a shank 32 which is clamped, as at 33, to the tool bar 14. Mounted by any suitable means, such as a bracket 34, above each tool 31 is a seed can 36 and suitable dispensing means 37 that delivers seed through a tube 38 to a shoe or furrow opener 39 disposed behind the sweep tool 31. The four units 30 are arranged in pairs, as best shown in Figure 1, and each pair is driven by a chain 41 trained over a sprocket 42 fixed to the associated axle shaft 8. Other tools may be mounted on the tool bar 13, as desired, and may be used with or without planting means.

A pair of gauge wheels 44 is provided for the frame 11, and each of the gauge wheels 44 is mounted for rotation on the outturned forward end of a gauge wheel crank axle 45. Each crank axle is mounted for rocking movement by bracket means 46 (Figure 3) which is secured to the tool bar 14. A bell crank supporting bracket 47 is secured by clamping means to the tool bar 14 and includes a forward end that is apertured to receive a pivot bolt 48 on which a bell crank 49 is mounted for rocking movement. One arm 51 of the bell crank 49 is connected by a link 62 to the lower or forward end of the gauge wheel crank axle 45. The other arm 63 of the bell crank 49 is connected to the forward end of a link 64, the rear end of which is connected to an arm 66 on a rockshaft 67 journaled in bracket means 68 carried by the tool bar 14. The outer end portion of the rockshaft 67 is supported by a bracket 69 clamped, as at 71 (Figure 1), to the tool bar 14. The gauge wheel construction at each side of the machine is substantially the same as just described, and hence further description is believed to be unnecessary.

The tractor 1 is equipped with a hydraulic power lift mechanism, indicated in its entirety by the reference numeral 55, and since such mechanism is similar to that shown in the United States Patent 2,107,760, issued February 8, 1938, to E. McCormick et al., to which reference may be made if necessary, the mechanism 55 will not be described in detail here. The power lift unit 55 includes a transverse rockshaft 56 which, under the control of a hand lever 57 and associated valve mechanism V enclosed in a valve box B, may be actuated by power derived from the tractor and moved from a lowered position into an upper or raised position, or vice versa. As best shown in said McCormick patent, the rockshaft 56 carries an arm 61 which is connected by a rod 62' with a piston 63' operating within a cylinder 64'. Fluid under pressure is supplied to the cylinder 63' by a pump P driven by suitable gearing from the tractor motor M under the control of the valve lever 57 and the valve mechanism V controlled by the latter.

Figure 2:
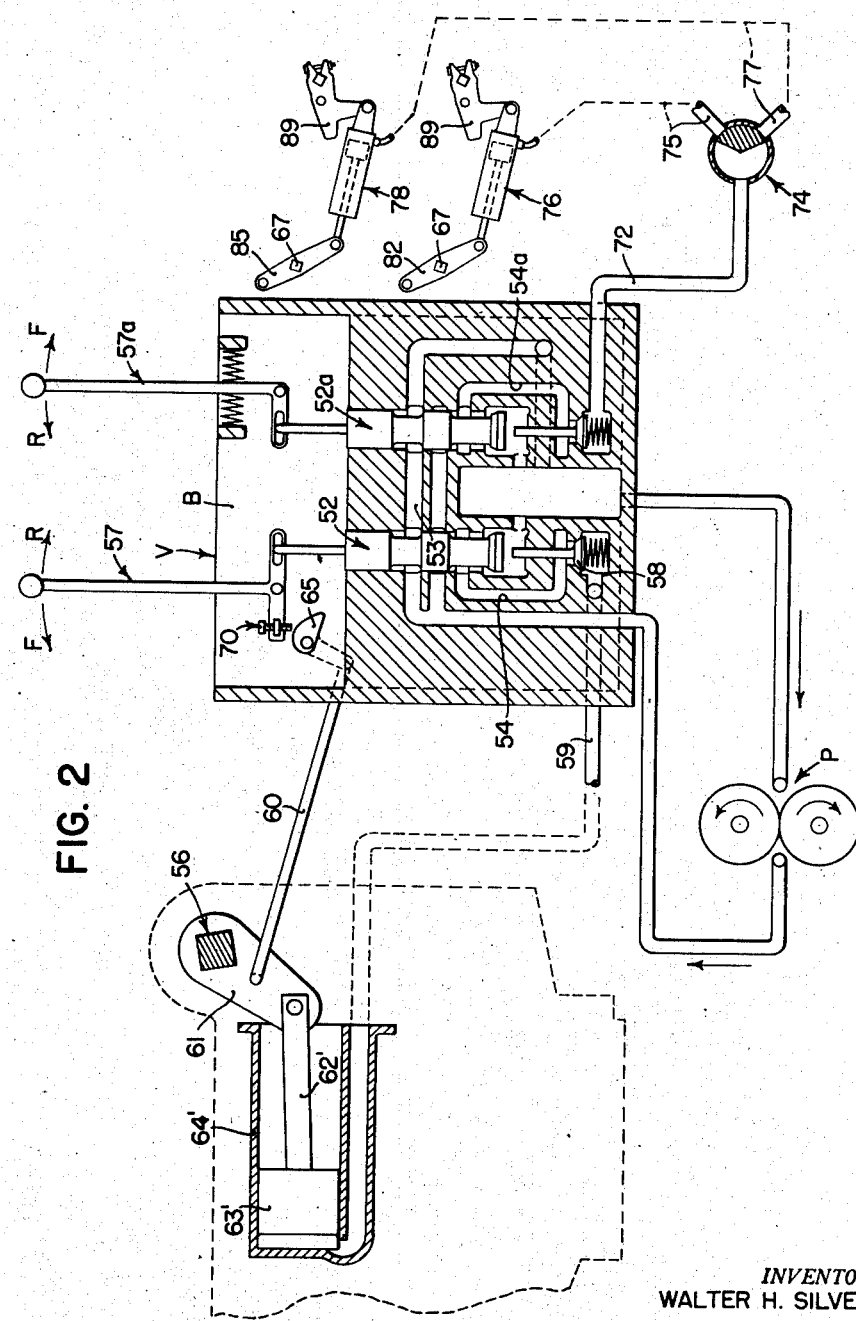
Figure 2 is a diagrammatic showing of the hydraulic valve controlling mechanism.

The control valve mechanism V for the power lift unit 55 is substantially the same as shown and claimed in the co-pending application, Serial No. 453,907, filed August 6, 1942, by W. Worthington, and hence is shown only diagrammatically here (Figure 2). Referring now to Figure 2, rocking the handle 57 in the direction indicated F (forward), raises a valve 52 and closes off an idle passage 53 leading to the sump s and diverts oil under pressure through passage 54 past a check valve 58 and out through a passage 59 to the cylinder 64'. Rocking the handle 57 in the other direction R (rearward) causes the lower end of the valve 52 to open the check valve 58, and oil flows out of the cylinder 64' through passages 59 and 54 to sump s.

When the valve lever 57 is swung in direction R to lower the valve 52 and fluid flows from the cylinder 64' through passages 59 and 54 to the sump s, the resulting movement of the piston 63' permits the rockshaft 56 to rock in a counter-clockwise direction (Figure 3), lowering the tools. A link 60 is connected to be shifted by the arm 61 and, in turn, rocks a cam member 65 (Figure 2) operating adjacent a member 70 (Figures 2 and 4) adjustably mounted on or relative to the valve lever 57. The parts are arranged that when the rockshaft 56 reaches a given point in the lowering direction, depending on the adjustment of part 70, the cam member 65 raises the valve 52 to neutral, thus automatically terminating the lowering movement of the rockshaft 56 and the associated tools.

The other valve 52a is controlled by a handle or valve lever 57a and operates in the same way, either to direct fluid under pressure through passages 54a and 72 and a two-way valve 74 to either of a pair of auxiliary ram units, or to permit fluid to flow from the auxiliary ram units back to the sump s.

The two-way valve 74 (Figure 1) is connected by a hose 75 with a left hand lift cylinder or ram unit 76 and by a hose 77 with a right hand lift cylinder or ram unit 78. The left hand lift cylinder or ram unit 76 is connected by a rigid link 81 to an arm 82 that is fixed to the laterally inner end of the left hand gauge wheel rockshaft 67. In a similar way, the right hand lift cylinder or ram unit 78 is connected by a rigid link 84 with an arm 85 fixed to the laterally inner end of the right hand gauge wheel rockshaft 67, as best shown in Figure 1. The forward end of the left hand lift cylinder 76 is pivotally connected, as best shown in Figure 3, to a downwardly directed extension 88 forming a part of the power lift arm 89 that is fixed to the left end of the power lift rockshaft 56. The power lift arm 89 includes a rearwardly directed section 91 that carries an adjustable set screw 92, and the latter is adapted to engage a lifting arm 93 pivoted, as at 94, to the power lift arm 89. The rear end of the arm 93 is pivoted, as at 97, to the upper end of a link 98, the lower end of which is pivoted, as at 99, to a bracket 101 that is fixed to the left frame bar 12. The right end of the power lift rockshaft 56 carries an arm and link construction substantially the same as just described, and hence the same reference numerals have been employed in Figure 1. Normally, when the power lift unit 55 is in its lowered or operating position, there is a space S (Figure 3) between the power lift arm extension 91 and the lifting arm 93, so that the implement frame 11 may rise and fall generally about its forward hitch point relative to the tractor. However, when the power lift operating lever 57 is actuated to cause fluid to be directed under pressure into the cylinder 63', the rockshaft 56 is rocked in a clockwise direction (Figure 3), causing both power lift arms 89 to engage the lifting arms 93 and raise both the implement frame and the gauge wheels into a raised or transport position. It will be noted from Figure 3 that the first movement of the rockshaft 56 from its lowered position acts through the downward extension 88 and the associated lift cylinder, 76 or 78, to first swing the gauge wheel rockshaft 67 in a clockwise direction and thereby raising the implement frame relative to the gauge wheel. Thereafter, the upper end of the set screw 92 engages the arm 93, and after this has occurred the implement frame and the gauge wheels are lifted directly.

The implement shown in Figure 1 is a relatively wide machine and occasionally it may be necessary to level the machine. This may be done easily and conveniently in the following manner. The handle of the two-way valve 74 is turned to select, for example, the left-hand lift cylinder 76. This opens the passage from the lift cylinder 76 to the operating valve 52a. After the two-way valve 74 has been turned to select the cylinder 76, the operating lever 57a is then actuated so as to direct fluid under pressure into the cylinder 76, in case it is desired to raise the left side of the machine. If it should be desired to lower the left side of the machine, then, with the valve 74 in the position selecting cylinder 76, the operating lever 57a would be turned into a lowering position, which would permit fluid to flow from the cylinder 76 back to the sump s of the hydraulic unit 55. In a like manner, the right side of the machine may be raised or lowered, by turning the handle of the two-way valve 74 over into a position selecting the cylinder 78, and then operating the control valve 52a in one direction or the other. In this way, the correct operating depth of the four tools carried by the tool bar 14 may be simply and quickly adjusted. The implement as a whole may be raised into transport position or lowered into operating position by proper manipulation of the main power lift valve lever 57.

As described above and as shown in Figure 3, each of the auxiliary or adjusting cylinders 76 and 78 is connected between its associated gauge wheel and the power lift arm 89 at that side of the tractor. One advantage of this particular arrangement is that when moving the implement from operating position into a raised or transport position, the gauge wheels 44 are first lowered before the implement is raised bodily. This serves to reduce the operating depth for a short distance prior to the actual lifting of the tools. In some cases it may not be desired to have this action, in which case the auxiliary lift or adjusting cylinders may be carried entirely on the implement frame and anchored to fixed brackets on the frame. This is the construction illustrated in Figure 4.

In Figure 4 the parts that are common with those shown in Figures 1–3 have been indicated by the same reference numerals. It will be observed from Figure 4 that each lift cylinder at its forward end is pivoted, as at 110, to the upper forward end of a bracket 111 that is bolted, as at 112, to a cross bar 113 forming a part of the implement frame 11. Figure 4 shows the connections and mounting for the left hand lift cylinder 76. The right hand lift cylinder 78 (Figure 1) is in the form of the invention illustrated in Figure 4 connected to the frame 11 in the same way. For convenience of illustration the seeding mechanism has been omitted from Figure 4.

Figure 5 shows another form of the present invention in which the auxiliary cylinders 76 and 78 are connected so as to secure an automatic change in the operating depth when the implement shifts rearwardly with respect to the tractor. Turning now to Figure 5, it will be noted that the implement frame 11 is connected to the tractor 1 by a yielding hitch 116. The hitch 116 comprises a yoke 117 pivoted at its upper end to the tractor and at its lower end to the forward end of the frame bars 12. A pair of links 121 extend forward from the pivot 119 by which the yoke 117 is connected to the frame bars 12, and at their forward ends the links are connected with the rear ends of a spring or a plurality of cushioning springs 122, the forward ends of which are connected in any suitable manner to the forward portion of the tractor. In this form of the invention, as shown in Figure 5, the left hand lift cylinder 76 is pivotally connected, as at 125, to the upper end of a vertically disposed lever 126, the intermediate portion of which is pivoted at 127 to a bracket 128 fixed to the implement frame 11, preferably to the cross bar 113. The lower end of the lever 126 is pivoted, as at 130, to the rear end of a link 131. The forward end of the link 131 is pivoted at 132 to the lower end of a bracket 133 bolted in any suitable manner to the rear axle. The other or right hand lift cylinder 78 is connected in the same way. The rear portions of the lift cylinders 76 and 78 are connected with the gauge wheel structure in the same manner as described above.

The operation of this form of the invention is substantially as follows. The implement may be leveled or adjusted for depth of operation by directing fluid under pressure into one or the other, or both, of the auxiliary lift cylinders 76 and 78, and the implement may be raised into inoperative or transport position in the same manner pointed out above in connection with the form of the invention shown in Figures 1–3. In the implement shown in Figure 5, however, the frame 11 is connected to the tractor through yielding means. Thus, if the tool 31 should strike an obstruction or encounter excessively hard ground, the implement shifts rearwardly relative to the tractor by the yielding of the springs 122. The link 131 connects the lower end of the lever 126 with the tractor, and therefore when the implement shifts rearwardly under the conditions assumed the lever 126 is rocked about the pivots 127 in a counterclockwise direction, thus exerting a rearwardly directed thrust through the cylinder 76 against the arm 82 on the crank axle rockshaft 67, causing the latter to turn in a clockwise direction (Figure 5). This movement acts through the link 64 and the bell crank 49 to exert a downwardly directed force through the link 62 against the associated gauge wheel 44, which raises the implement frame 11 an amount more or less proportional to the amount of yielding of the springs 122 and the amount of rearward movement of the implement frame as a whole. While this linkage thus automatically provides for decreasing the depth of operation when the ground is hard or abnormal loads are encountered, the operation of the auxiliary lift or depth adjusting cylinders 76 and 78 is not affected, since fluid directed under pressure into either or both of them acts against the levers 126 to raise or lower the gauge wheels as desired.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural machine, support means, a source of power thereon, an implement unit movably carried thereby, a pair of separately movable gauge means connected with said implement unit, a pair of separate power units carried at least in part on said implement unit and connected to shift said gauge means, controllable means connecting each of said power units with said source of power on the support means, a separate power unit on said support means and reacting against the latter for raising both said gauge means and said implement unit, and separate controllable means connecting said separate power unit with said source of power on said support means.

2. A tractor-mounted widespread implement comprising a transverse frame, a pair of gauge wheels, one at each end of said frame, a source of power on the tractor, a pair of power units deriving power from said source for controlling the position of said gauge wheels, a separate power unit also deriving power from said source and connected to raise both of said gauge wheels and said transverse frame, and control mechanism connected between said power units and said source of power and arranged to direct power optionally to either of said pair of power units or to said separate power unit.

3. An agricultural implement comprising supporting frame means, tool means movable relative to said supporting frame means, a power unit on said supporting frame means and including a power operated part movable through two ranges of movement, means connecting said power operated part with said tool means to move the latter into and out of operating position by movement of said part through one range of movement, and means acting between said power operated part and said tool means for adjusting the operating depth of the latter by movement of said power operated part through its other range of movement when the tool means are in operating position.

4. The combination of a tractor having a power actuated movable member operable through two ranges of movement, an implement having a pair of laterally spaced shiftable parts and connected with the tractor, a pair of motion-transmitting means connecting said movable member and said shiftable implement parts, respectively, whereby movement of said power actuated movable member through one of its ranges serves to adjust both of said parts simultaneously, each of said motion-transmitting means including relatively shiftable sections, means associated with each of said motion-transmitting means for shifting one of said sections relative to the other, and means whereby movement of said power actuated member through its other range of movement shifts said implement independent of said pair of motion-transmitting means.

5. The combination of a tractor having a source of fluid pressure and a ram operated thereby, an implement having a shiftable part and connected with the tractor, motion-transmitting means connecting said shiftable implement part with said ram to be actuated thereby, said motion-transmitting means including relatively shiftable sections, fluid pressure actuated means deriving operating energy from said source of fluid pressure on the tractor for shifting one of said sections relative to the other, and means on the tractor for controlling the flow of fluid under pressure from said source to said fluid pressure actuated means.

6. An agricultural machine comprising supporting means, tool means, longitudinally shiftable draft transmitting means connecting said supporting means and said tool means, ground engaging gauge means carried by said tool means and shiftable relative thereto for controlling the operating position of the tool means, connecting means between said supporting means and gauge means whereby the latter is shifted upon the occurrence of longitudinal movement of the tool means relative to the supporting means, said connecting means including an adjustable power operated unit operable for changing the operating depth of said tool means, a source of power for said unit, and means controlling the transmission of power to said unit for adjusting the depth of operation of said tool means.

7. A tractor-mounted implement comprising tool means, a pair of ground engaging gauge means therefor, a rockshaft on the tractor, a pair of hydraulic units connected between said rockshaft and said gauge means, respectively, a source of power on the tractor for operating said hydraulic units, and means on the tractor for rocking said rockshaft.

8. An agricultural implement adapted to be connected with a tractor, comprising a tool support mounted for both vertical and longitudinal movement relative to the tractor, hitch means yieldingly resisting longitudinal movement of said tool support, ground engaging gauge means movable relative to said tool support, hydraulically operated means supported, at least in part, on said tool support for operating said gauge means, and means connected with said hydraulic means and acting therethrough for shifting said gauge means upon the occurrence of movement of said tool support relative to said tractor.

9. An agricultural machine comprising propelling means including a source of fluid under pressure, tool means connected with said propelling means for both vertical and longitudinal movement relative thereto, ground engaging gauge means carried by said tool means and movable relative thereto, fluid pressure operated means for adjusting the position of said gauge means, and means responsive to longitudinal movement of said tool means for shifting the position of said gauge means and varying the depth of operation of said tool means.

10. An agricultural machine comprising a tool support, a pair of rockshafts mounted on said tool support, a pair of gauge wheels, one connected with the outer end of each rockshaft, an arm connected to the inner end of each rockshaft, a pair of brackets fixed to said tool support, and a pair of hydraulic lift cylinders, one connected between each bracket and the associated arm, for adjusting said gauge wheels.

11. The combination of a tractor, a tool support, yieldable means connecting said tool support with the tractor, a gauge wheel rockably mounted on said tool support, a lever rockably mounted on said tool support and connected at one end with said gauge wheel for rocking the latter when the lever is rocked, and a connection between said lever and the tractor whereby when said tool support is shifted relative to the tractor the gauge wheel is rocked relative to said tool support.

12. An agricultural implement adapted to be connected with a tractor having a source of fluid under pressure, comprising a tool support, yieldable hitch means connecting said tool support with the tractor and accommodating rearward movement of the tool support relative thereto, a pair of rockshafts mounted on said tool support, a pair of gauge wheels, one connected with the outer end of each rockshaft, an arm connected to the inner end of each rockshaft, a pair of brackets secured to said tool support and disposed, respectively, adjacent said arms, a pair of lift cylinders connected between each arm and the associated bracket, and means selectively connecting said lift cylinders with said source of fluid pressure on the tractor.

13. An agricultural implement adapted to be connected with a tractor having a source of fluid under pressure, comprising a tool support, yieldable hitch means connecting said tool support with the tractor and accommodating rearward movement of the tool support relative thereto, a pair of rockshafts mounted on said tool support, a pair of gauge wheels, one connected with the outer end of each rockshaft, an arm connected to the inner end of each rockshaft, a pair of brackets secured to said tool support and disposed, respectively, adjacent said arms, a lever pivoted to each bracket, a pair of lift cylinders connected, respectively, between said levers and said arms, connecting means between said levers and the tractor, whereby shifting movement of the tool support relative to the tractor causes pivotal movement of said levers and acts through said lift cylinders for adjusting said gauge wheels, and means controllably connecting said lift cylinders with the source of fluid pressure on the tractor whereby said gauge wheels may be shifted by directing fluid under pressure to said lift cylinders.

14. An agricultural implement adapted to be connected to a tractor having a source of fluid pressure and a pair of rockable members operated thereby, comprising a tool support, a pair of gauge wheels rockably connected therewith, a pair of lift cylinders connected between said gauge wheels, respectively, and the associated rockable member on the tractor, connections between said lift cylinders and said source of fluid pressure, said connections including a two-way valve for controlling selective operation of said lift cylinders.

15. An agricultural implement adapted to be connected to a tractor having a source of fluid pressure, a pair of rockable members, and hydraulic means connecting said members with said source of fluid pressure for shifting said members through two ranges, a tool support, a pair of gauge wheels rockably connected therewith, a pair of lift cylinders connected between said gauge wheels, respectively, and the associated rockable members on the tractor, connections between said lift cylinders and said source of fluid pressure whereby movement of said rockable members through their first range of movement acts through said lift cylinders to adjust the position of said gauge wheels, means for selectively operating said lift cylinders, and means connecting said rockable members with said tool support for lifting both the latter and said gauge wheels.

16. An agricultural implement adapted to be connected to a tractor having a source of power, a power operated member actuable by power derived from said source of power, a tool support, a pair of separately movable gauge wheels connected therewith, means including a lift cylinder for connecting each gauge wheel with said power operated member whereby operation of the latter acts through said lift cylinders to adjust the position of said gauge wheels relative to said tool support, and optionally controllable means deriving power from said source of power for actuating said lift cylinders individually.

17. An agricultural implement adapted to be connected to a tractor having a source of power, a power operated member actuable by power derived from said source of power, a tool support, a pair of separately movable gauge wheels connected therewith, means adjustable as to effective length for connecting each gauge wheel with said power operated member whereby operation of the latter acts through said adjustable means for adjusting the position of both of said gauge wheels relative to said tool support, and means for individually adjusting said adjustable means.

18. An agricultural machine comprising a tractor having a power connection, tool means connected with the tractor and having a pair of individually operable gauging means, and a pair of adjustable units connected, respectively, between said pair of gauging means and said power connection whereby operation of the latter acts to adjust both of said gauging means relative to the tool means.

19. The combination of a tractor, a tool support, yieldable means connecting said tool support with the tractor, a gauge wheel rockably mounted on said tool support, a part rockably mounted on said tool support and connected with said gauge wheel for rocking the latter when the part is rocked, and a connection between said part and the tractor whereby when said tool support is shifted relative to the tractor the gauge wheel is rocked relative to said tool support.

20. The combination of a tractor, a tool support, yieldable means connecting said tool support with the tractor, a gauge wheel rockably mounted on said tool support, a lever rockably mounted on said tool support and connected at one end with said gauge wheel for rocking the latter when the lever is rocked, and a connection between the other end of said lever and the tractor whereby when said tool support is shifted relative to the tractor the gauge wheel is rocked relative to said tool support.

21. An agricultural machine comprising supporting means, tool means, longitudinally shiftable draft transmitting means connecting said supporting means and said tool means, ground engaging gauge means carried by said tool means and shiftable relative thereto for controlling the operating position of the tool means, connecting means between said supporting means and gauge means whereby the latter is shifted upon the occurrence of longitudinal movement of the tool means relative to the supporting means, said connecting means including an adjustment operable for changing the operating depth of said tool means, and means for changing said adjustment for adjusting the depth of operation of said tool means.

22. An agricultural machine comprising propelling means including a source of fluid under pressure, tool means connected with said propelling means for both vertical and longitudinal movement relative thereto, ground engaging gauge means carried by said tool means and movable relative thereto, and means responsive to longitudinal movement of said tool means for shifting the position of said gauge means and varying the depth of operation of said tool means.

23. An agricultural implement adapted to be connected to a tractor having a source of fluid pressure, comprising a tool support, a pair of gauge wheels rockably connected therewith, a pair of lift cylinders connected between said gauge wheels, respectively, and the tractor, connections between said lift cylinders and said source of fluid pressure, said connections including a two-way valve for controlling selective operation of said lift cylinders.

24. An agricultural implement adapted to be connected to a tractor having a source of fluid pressure, a tool support connected with the tractor for generally free vertical movement relative thereto, a pair of gauge wheels rockably connected with said tool support, a pair of lift cylinders, each pivotally connected with the tractor and the associated gauge wheel and the pivot connections being spaced apart generally in a fore and aft direction whereby said lift cylinders do not interfere with said generally free vertical movement of the tool support relative to the tractor, connections between said lift cylinders and said source of fluid pressure.

WALTER H. SILVER.